No. 706,695. Patented Aug. 12, 1902.
W. SIEGFRIED.
LABEL WITH METAL FASTENING CLAMP.
(Application filed Sept. 29, 1899.)

(No Model.)

UNITED STATES PATENT OFFICE.

WILHELM SIEGFRIED, OF CHEMNITZ, GERMANY.

LABEL WITH METAL FASTENING-CLAMP.

SPECIFICATION forming part of Letters Patent No. 706,695, dated August 12, 1902.

Application filed September 29, 1899. Serial No. 732,126. (No model.)

*To all whom it may concern:*

Be it known that I, WILHELM SIEGFRIED, a subject of the German Emperor, and a resident of Chemnitz, Germany, have invented certain new and useful Improvements in Labels with Metal Fastening-Clamps, of which the following is a specification.

The object of my present invention is to provide an improved label having metal fastening clamps or clips adapted to be easily and readily attached to any article of soft material, such as fabric, garments, &c.

Figure 1:
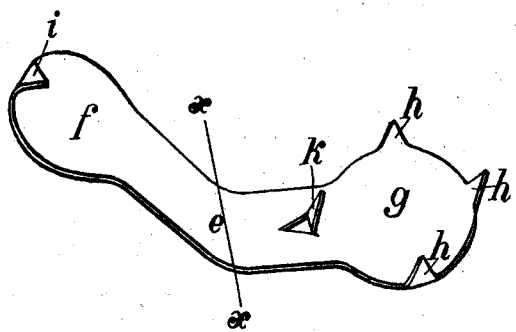
Figure 2:
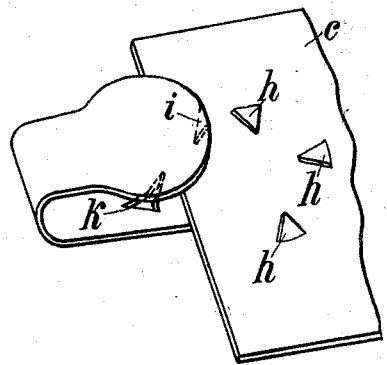
Figure 3:
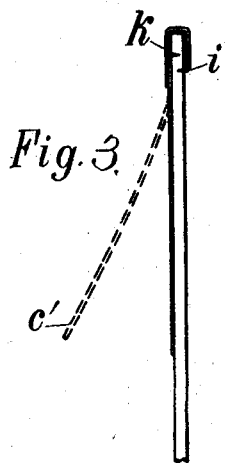
Figure 4:
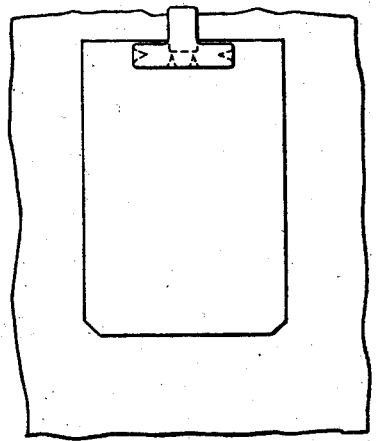

In the accompanying drawings, forming a part of this specification, Figure 1 is a view on an enlarged scale of a clip according to my invention. Fig. 2 shows the clip as fixed to a label, the article being omitted for the sake of clearness. Figs. 3 and 4 show the clip attached to the label in connection with the article.

Like letters refer to like parts throughout all the figures.

The new clip consists of a piece of metal bent at $e$ to form two flaps $f$ and $g$ in such a manner that the flap $f$, which is the back part of the clip, is shorter than the flap $g$, which is the front part. The flap $g$ is provided with claws $h$, which serve to fasten it to the label. The flap $f$ is, moreover, provided with a tooth $i$ and the flap $g$ with a tooth $k$. It is to be noticed that both these teeth $i$ and $k$ enter into the labeled article when the clip is in use, and the said teeth are so arranged that the tooth $i$ is covered by the front part of the clip and the tooth $k$ by the rear part of the clip when holding the article. Consequently the points do not protrude and are not visible when the clip is in use. In the event of the label $c$ being accidentally engaged with another article, and thereby lifted, as shown by the dotted line $c'$, Fig. 6, although this would displace to some extent one of the teeth, the other tooth would be unaffected or be more deeply embedded in the labeled article, and thus there would be no danger of the label being detached.

The teeth $i$ and $k$ are so short and pointed that the clip may be used with the finest or most delicate articles without injuring the latter, while still providing a perfect attachment of the label.

When the label $c$ is secured on the clip by means of the claws $h$, the same is laid upon the edge of the article, so that the said edge is located on or about the line $x\ x$. Then a simple pressure produced by the fingers will be sufficient to bring the clip from the open position, Fig. 1, to the closed position, Fig. 2, whereby the teeth $i$ and $k$ engage and hold the article from opposite sides.

The device may be modified by making the plates $f$ and $g$ smaller or larger, according to the nature of the article to be labeled. Likewise the teeth $i$ and $k$ may be made longer or shorter in accordance with the thickness of the article. Their number and position also may be altered without departing from the scope or sacrificing any of the advantages of the invention.

Having fully described my invention, what I claim, and desire to secure by Letters Patent, is—

A label-clip comprising a strip of metal having enlarged ends and bent to form a pair of flaps one of greater length than the other, a plurality of claws on the outer edge of the longer flap, a perpendicular tooth located at an intermediate point on the inner face of said longer flap and a tooth on the outer edge of the shorter flap bent inwardly to oppose said intermediate tooth.

WILHELM SIEGFRIED. [L. S.]

Witnesses:
BERNHARD RUHN,
KLARA HAMMER.